US009537832B2

(12) United States Patent
Shui

(10) Patent No.: US 9,537,832 B2
(45) Date of Patent: *Jan. 3, 2017

(54) METHOD, SYSTEM AND DEVICE FOR ESTABLISHING LINK

(71) Applicant: Quanta Computer Inc., Kuei Shan Hsiang, Tao Yuan Shien (TW)

(72) Inventor: Hsien-Yao Shui, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 167 days.

This patent is subject to a terminal disclaimer.

(21) Appl. No.: 14/565,680

(22) Filed: Dec. 10, 2014

(65) Prior Publication Data

US 2016/0028697 A1    Jan. 28, 2016

(30) Foreign Application Priority Data

Jul. 22, 2014   (TW) .............................. 103125049 A

(51) Int. Cl.
| H04L 29/06 | (2006.01) |
| H04L 9/08 | (2006.01) |
| H04W 12/00 | (2009.01) |
| H04W 12/04 | (2009.01) |
| H04W 48/20 | (2009.01) |
| H04W 84/18 | (2009.01) |

(52) U.S. Cl.
CPC ............. *H04L 63/0428* (2013.01); *H04L 9/08* (2013.01); *H04L 63/061* (2013.01); *H04W 12/00* (2013.01); *H04W 12/04* (2013.01); *H04W 48/20* (2013.01); *H04W 84/18* (2013.01)

(58) Field of Classification Search
CPC ...... H04W 12/00; H04W 12/02; H04W 12/04; H04W 12/06; H04W 12/08; H04L 9/08; H04L 9/0861; H04L 9/0863; H04L 9/0866
See application file for complete search history.

(56) References Cited

U.S. PATENT DOCUMENTS

| 2006/0221915 A1 | 10/2006 | Gatta et al. |
| 2009/0010230 A1 | 1/2009 | Lee et al. |
| 2009/0019283 A1* | 1/2009 | Muralidharan ....... H04L 63/065 713/168 |

(Continued)

OTHER PUBLICATIONS

Chinese language office action dated Nov. 17, 2015, issued in application No. TW 103125049.

*Primary Examiner* — Edward Zee
(74) *Attorney, Agent, or Firm* — McClure, Qualey & Rodack, LLP

(57) ABSTRACT

A method and device for establishing link are provided. The method for establishing link is applied to an Ad-Hoc network includes: generating, by a first electrical device, a first part of a service set identifier according to a user's name and a network-card address; generating a second part of the service set identifier according to the first part of the service set identifier, a private key and a first algorithm; generating the service set identifier according to the first part of the service set identifier and the second part of the service set identifier; generating a link password according to the service set, the private key and a second algorithm; and establishing, by a second electrical device, a link with the first electrical device according to the service set identifier, the private key, the first algorithm and the second algorithm.

20 Claims, 5 Drawing Sheets

(56) References Cited

U.S. PATENT DOCUMENTS

2010/0208662 A1\* 8/2010 Fuste Vilella ........ H04W 40/00
 370/328
2012/0158922 A1 6/2012 Aggarwal et al.
2013/0272224 A1\* 10/2013 Ogawara ............. H04W 76/021
 370/329

\* cited by examiner

ND DEVICE FOR
METHOD, SYSTEM AND DEVICE FOR ESTABLISHING LINK

CROSS REFERENCE TO RELATED APPLICATIONS

This Application claims priority of Taiwan Patent Application No. 103125049, filed on Jul. 22, 2014, the entirety of which is incorporated by reference herein.

BACKGROUND OF THE INVENTION

Field of the Invention

The disclosure is related to establishing a wireless link for Ad-Hoc technology, and, more particularly, to establishing a wireless link by Service Set Identifier (SSID) and password which are generated by a user's name and network card address.

Description of the Related Art

Recently, because of the rapid development of wireless communications, it has become more and more popular for users to use electrical devices and mobile devices to transmit information and data by wireless networks.

Wireless network architectures can be divided into AD-Hoc wireless network architecture and Infrastructure wireless network architecture. AD-Hoc wireless network is a peer-to-peer (P2P) transmission mode. In the AD-Hoc wireless network architecture specified in 802.11, a device or work station can directly process peer-to-peer (P2P) transmissions without going through an access point (AP). Namely, AD-Hoc wireless network is a kind of peer-to-peer network without a wireless access point. For, AD-Hoc wireless network architecture, when electrical devices install wireless network devices (e.g. a network card), the wireless connection between electrical devices can be established by the wireless network devices. The principle of AD-Hoc wireless network architecture is that one computer is configured to establish a peer-to-peer link, and other computers will establish network links and share files with each other through the peer-to-peer link.

However, in traditional AD-Hoc wireless network architecture, the user needs to set the AD-Hoc wireless network with complex settings. The user needs to open multiple windows to complete the AD-Hoc wireless network settings by setting the options in the windows. As a result, it is not convenient for the user to use the AD-Hoc wireless network. In addition, when the user doesn't want to continuously use the AD-Hoc wireless network, he needs to close the AD-Hoc wireless network and release the IP address by setting the options in the windows again. Therefore, if the user forgets to close the AD-Hoc wireless network, the power of the system will be wasted. Therefore, how to make the setting of the AD-Hoc wireless network become simpler and more efficient is worthy of discussion.

BRIEF SUMMARY OF THE INVENTION

A system and method of sleep detection are provided to overcome the problems mentioned above.

An embodiment of the invention provides a method for establishing a link. The method comprises the steps of generating, by a first electrical device, a first part of a service set identifier according to a user's name, a network-card address; generating a second part of the service set identifier according to the first part of the service set identifier, a private key and a first algorithm; generating the service set identifier according to the first part of the service set identifier and the second part of the service set identifier; generating a link password according to the service set, the private key and a second algorithm; and establishing, by a second electrical device, a link with the first electrical device according to the service set identifier, the private key, the first algorithm and the second algorithm.

An embodiment of the invention provides a system for establishing a link which is applied to an Ad-Hoc network. The system comprises a first electrical device and a second electrical device. The first electrical device is configured to generate a first part of a service set identifier according to a user's name and a network-card address; to generate a second part of the service set identifier according to the first part of the service set identifier, a private key and a first algorithm; to generate the service set identifier according to the first part of the service set identifier and the second part of the service set identifier; and to generate a link password according to the service set, the private key and a second algorithm. The second electrical device is configured to establish a link with the first electrical device according to the service set identifier, the private key, the first algorithm and the second algorithm.

An embodiment of the invention provides a device for establishing a link which is applied to a host of an Ad-Hoc network. The device comprises a wireless network module which is configured to link with another electrical device, a control module which is configured to generate a first part of a service set identifier according to a user's name, a network-card address, generate a second part of the service set identifier according to the first part of the service set identifier, a private key and a first algorithm, generate the service set identifier according to the first part of the service set identifier and the second part of the service set identifier and generate a link password according to the service set, the private key and a second algorithm, and a storage module which is configured to store the first algorithm, the second algorithm and the private key.

An embodiment of the invention provides a device for establishing a link which is applied to a host of an Ad-Hoc network. The device comprises a wireless network module, a control module and a storage module. The wireless network module is configured to link with another electrical device. The control module is configured to filter all scanned service set identifiers in a network to determine all the scanned service set identifiers whose second part is generated according to its first part by a private key and a first algorithm. The control module selects the electrical device for the link from the filtered service set identifiers, and then generates a password according to the service set identifier of the selected electrical device, the private key, and a second algorithm to establish the link with the electrical device. The storage module stores the first algorithm, the second algorithm and the private key.

Other aspects and features of the invention will become apparent to those with ordinary skill in the art upon review of the following descriptions of specific embodiments of communication transmission methods and systems

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
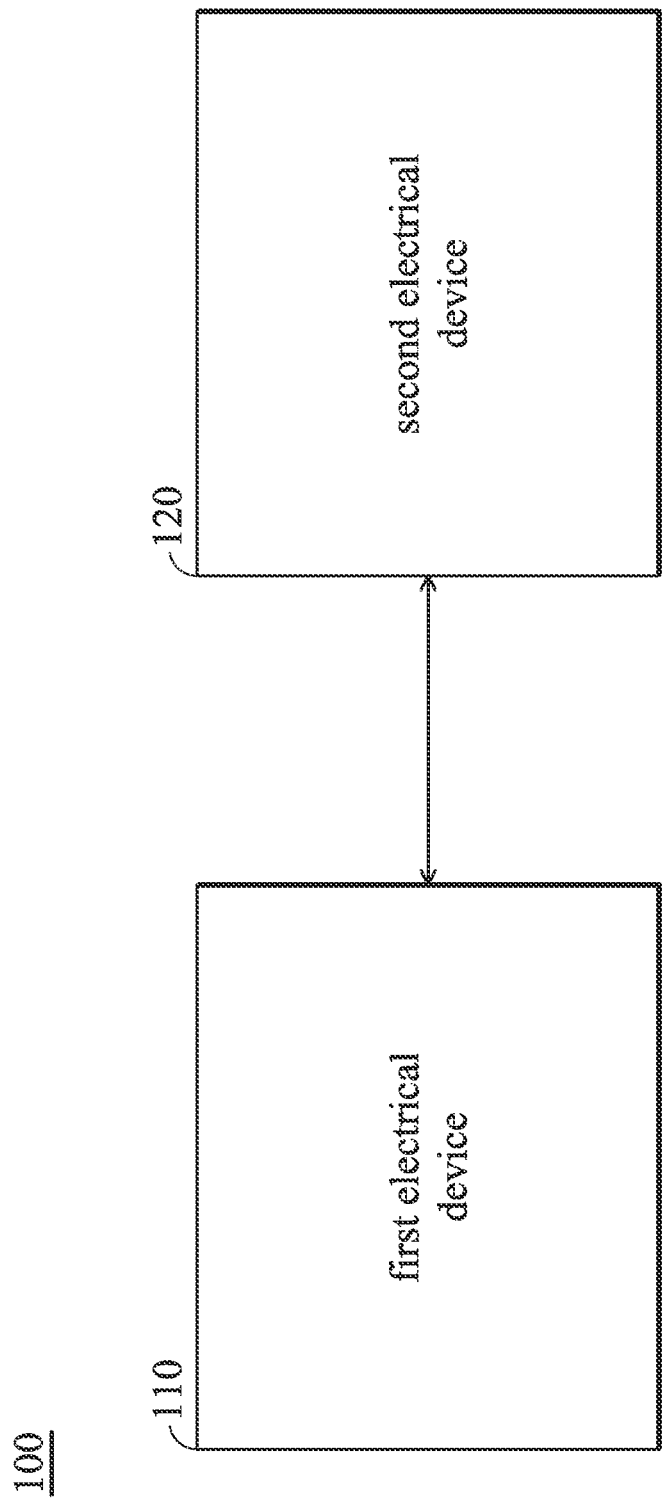
FIG. 1 is block diagram illustrating the system 100 for establishing a wireless link according to an embodiment of the invention.

FIG. 1 is block diagram illustrating the system 100 for establishing a wireless link according to an embodiment of the invention. The system 100 for establishing a wireless link is applied to an Ad-Hoc network. As shown in FIG. 1, the system 100 for establishing a wireless link comprises a first electrical device 110 and a second electrical device 120. Note that, in order to clarify the concept of the invention, the first electrical device is regarded as a host of the Ad-Hoc network and the second electrical device 120 is regarded as a client of the Ad-Hoc network. However, the invention should not be limited thereto. The first electrical device can also be regarded as the client of the Ad-Hoc network, or both as the host and the client of the Ad-Hoc network at the same time. The second electrical device also can be regarded as the host of the Ad-Hoc network or regarded as the host and the client of the Ad-Hoc network at the same time. In addition, in the embodiments of the invention, the Ad-Hoc network can be established with more than two electrical devices. Namely, the number of electrical devices is not limited to the first electrical device 110 and the second electrical device 120.

The first electrical device 110 and the second electrical device 120 may be user equipment, a wireless device, a mobile phone, a personal communication service (PCS) phone, a cordless phone, a session initiation protocol (SIP) phone, a wireless local loop (WLL) station, a personal digital assistant (PDA), a portable device with wireless link function or a processing device linked with a wireless modem.

Figure 2:
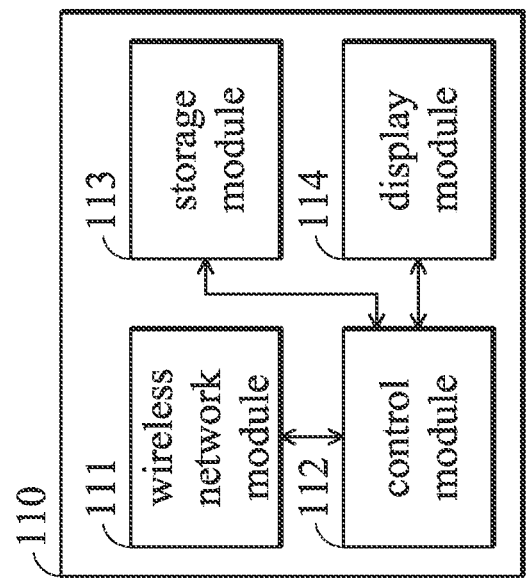
FIG. 2 is block diagram illustrating the first electrical device 110 according to an embodiment of the invention.

FIG. 2 is block diagram illustrating the first electrical device 110 according to an embodiment of the invention. As shown in FIG. 2, the first electrical device 110 comprises a wireless network module 111, a control module 112, a storage module 113 and a display module 114.

In embodiment of the invention, wireless network module 111 may support a plurality of wireless transmission technology, such as Wi-Fi, Ad-Hoc, and so on. The first electrical device 110 may establish a wireless link with another electrical device by the wireless network module 111.

In an embodiment of the invention, the storage module 113 can be regarded as a memory device, the memory device may be a volatile memory (e.g. Random Access Memory (RAM)), a non-volatile memory (e.g. flash memory, Read Only Memory (ROM)), a hard disk, or a combination of the above memory devices. In another embodiment of the invention, the storage module 113 also can be an external storage device. The storage module 113 is configured to pre-store a first algorithm, a second algorithm and a private key for the first electrical device 110. In an embodiment of the invention, the first algorithm and the second algorithm may be regarded as an Asymmetric Cryptographic Algorithm (ACA) (e.g. an RSA Cryptographic Algorithm, a Digital Signature Algorithm (DSA), and so on), or a Symmetric Cryptographic Algorithm (e.g. a Data Encryption Standard (DES) algorithm, an Advanced Encryption Standard (AES) algorithm, and so on).

When the first electrical device 110 establishes an Ad-Hoc link, the control module 112 of the first electrical device 110 will generate the first part of a service set identifier (SSID) for the host according to the user's name, a network-card address. Namely, the first part is the first half of the service set identifier. For example, if the user's name is Alex, and the network-card address is 08-00-27-00-DC-FE, the control module 110 may generate the first part of the service set identifier according to the user's name, and the last three digits of the network-card address, making the first part of the service set identifier Alex,00DCFE. Note that this example is only used for illustrating the embodiment of the invention, and it is to be understood that the invention is not limited thereto. The control module 122 can also generate the first part of the service set identifier according to a different method, e.g. selecting the first three digits of the network-card address, or using different symbols, such as a semicolon (;) or exclamation mark (!) to separate the user's name and the network-card address.

After the first part of the service set identifier is generated, the control module 112 will generate the second part of the service set identifier according to the first part of the service set identifier, a private key and a first algorithm. Namely, the second part is the last half of the service set identifier. Then, the control module 112 may generate the service set identifier according to the first part and the second part of the service set identifier. For example, if the first part of the service set identifier is Alex,00DCFE, and the second part of the service set identifier generated by the first part of the service set identifier, the private key and the first algorithm is h&^234S!--$86tg#~d %!, the control module 112 will combine the first part and the second part of the service set identifier to generate a 32-bits service set identifier, namely Alex,00DCFE; h&^234S!--$86tg#~d %!. Note that, this example is only used for illustrating the embodiment of the invention, and it is to be understood that the invention is not limited thereto. The control module 112 also can using use different symbols, such as a comma (,) or exclamation mark (!) to separate the first part and the second part of the service set identifier. In an embodiment of the invention, the control module 112 generate a link password for the Ad-Hoc network according to the service set identifier, the privacy key and a second algorithm.

Figure 3:
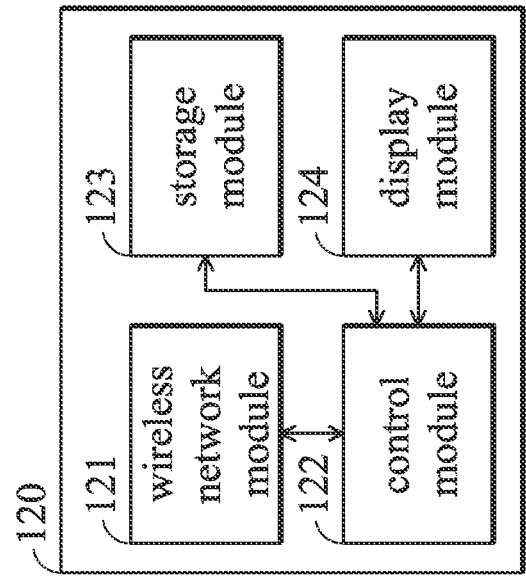
FIG. 3 is block diagram illustrating the second electrical device 120 according to an embodiment of the invention.

FIG. 3 is block diagram illustrating the second electrical device 120 according to an embodiment of the invention. As shown in FIG. 3, the second electrical device 120 comprises a wireless network module 121, a control module 122, a storage module 123 and a display module 124.

In an embodiment of the invention, the wireless network module 121 similar to wireless network module 111 may support a plurality of wireless transmission technologies, such as Wi-Fi, Ad-Hoc, and so on. The second electrical device 120 may establish a wireless link with another electrical device by the wireless network module 121. The storage module 123 similar to storage module 113 is configured to pre-store a first algorithm, a second algorithm and a private key for the second electrical device 120.

When the second electrical device 120 wants to join the Ad-Hoc network, after the first electrical device 110 has generated the service set identifier and link password and established the Ad-Hoc network, the control module 122 of the second electrical device 120 will scan all of the service set identifiers in the network, and filter the scanned service set identifiers by the private key and the first algorithm to determine all the scanned service set identifiers whose the second part is generated according to the first part. If the second part of one service set identifier is generated according to the first part of this service set identifier, the control module 122 will command the display module 124 to display this service set identifier; and if the second part of one service set identifier is not generated according to the first part of this service set identifier, the control module 122 will filter out this service set identifier. In an embodiment of the invention, if there are more than one service set identifiers after filtering all of the service set identifiers which are scanned in the network, the control module 122 will arrange these service set identifiers in order according to the signal strengths of these service set identifiers, and the display module 124 will display the arranged result. Therefore, most of the service set identifiers scanned in the network will be filtered by the above method to allow the user to select a service set identifier more easily.

According to the filtered result, the user selects the service set identifier corresponding to the first electrical device 110 from the display module 124. The control module 122 generates the link password according to the service set identifier corresponding to the first electrical device 110, private key and the second algorithm. The control module 122 may automatically determine whether the link password is a match for with the link password generated by the first electrical device 110, and the user doesn't input the password himself after generating the link password. If the link password is a match for the link password generated by the first electrical device 110, the second electrical device 120 will be able to establish the Ad-Hoc link with the first electrical device 110.

Figure 4:
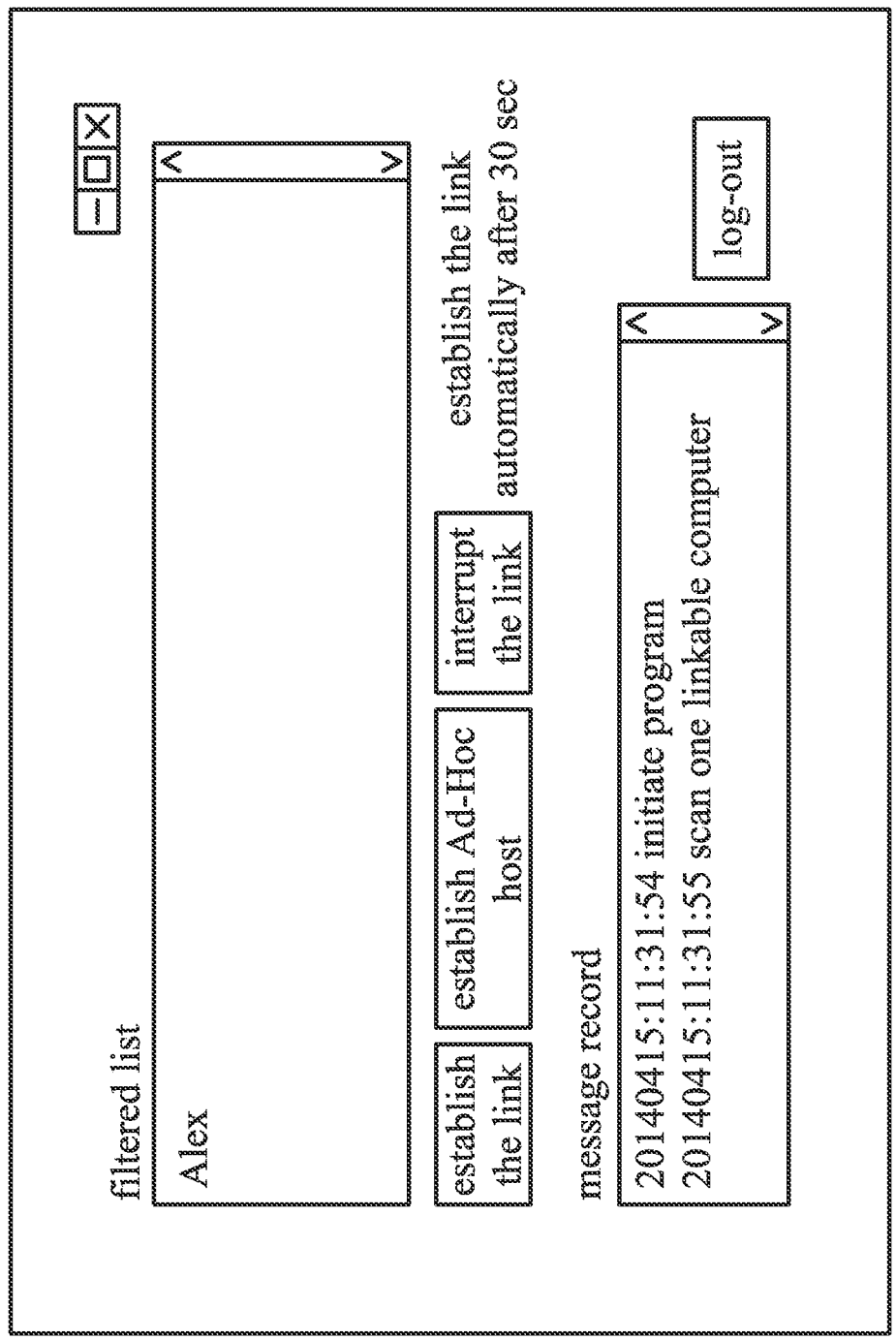
FIG. 4 is schematic diagram illustrating the display module 114 and the display module 124 according to an embodiment of the invention.

FIG. 4 is a schematic diagram illustrating the display module 114 and the display module 124 according to an embodiment of the invention. As shown in FIG. 4, in an embodiment of the invention, the display module 114 and the display module 124 may display a user interface to provide different options for the user to set and select. In an embodiment of the invention, the control module 112 and control module 122 may determine the first electrical device 110 and the second electrical device 120 is a host, a client, or both a client and a client at the same time according to the settings input by the user on the user interface. In an embodiment of the invention, the control module 112 and control module 122 may determine the first electrical device 110 and the second electrical device 120 will establish the link or interrupt the link according to a setting result of the user on the user interface. In an embodiment of the invention, the user interface of the display module 114 and the display module 124 may display the message record of the current link and display the service set identifiers corresponding to the electrical devices which can establish Ad-Hoc network with the first electrical device 110 and the second electrical device 120. In an embodiment of the invention, the user interface of the display module 114 and the display module 124 can be operated by the keyboard, the mouse or by the touch of a finger. Note that the user interface shown in FIG. 4 is only used for illustrating the embodiment of the invention, and it is to be understood that the invention is not limited thereto. In different embodiments of the invention, the user interface may have different configurations.

In an embodiment of the invention, the first electrical device 110 and the second electrical device 120 may automatically pre-set their IP addresses. For the first electrical device 110, when the first electrical device 110 establishes the Ad-Hoc network, the control module 112 will pre-set a fixed IP address. For the second electrical device, when the second electrical device wants to join the Ad-Hoc network established by the first electrical device, the control module 122 will select an IP address to transmit a packet to confirm whether the IP address has been used to avoid conflict of the IP address. If the IP address has been used, the control module 122 may select another IP address. Until confirming that one address has not been used, the control module 122 may select the IP address as the IP address of the second electrical device.

Figure 5:
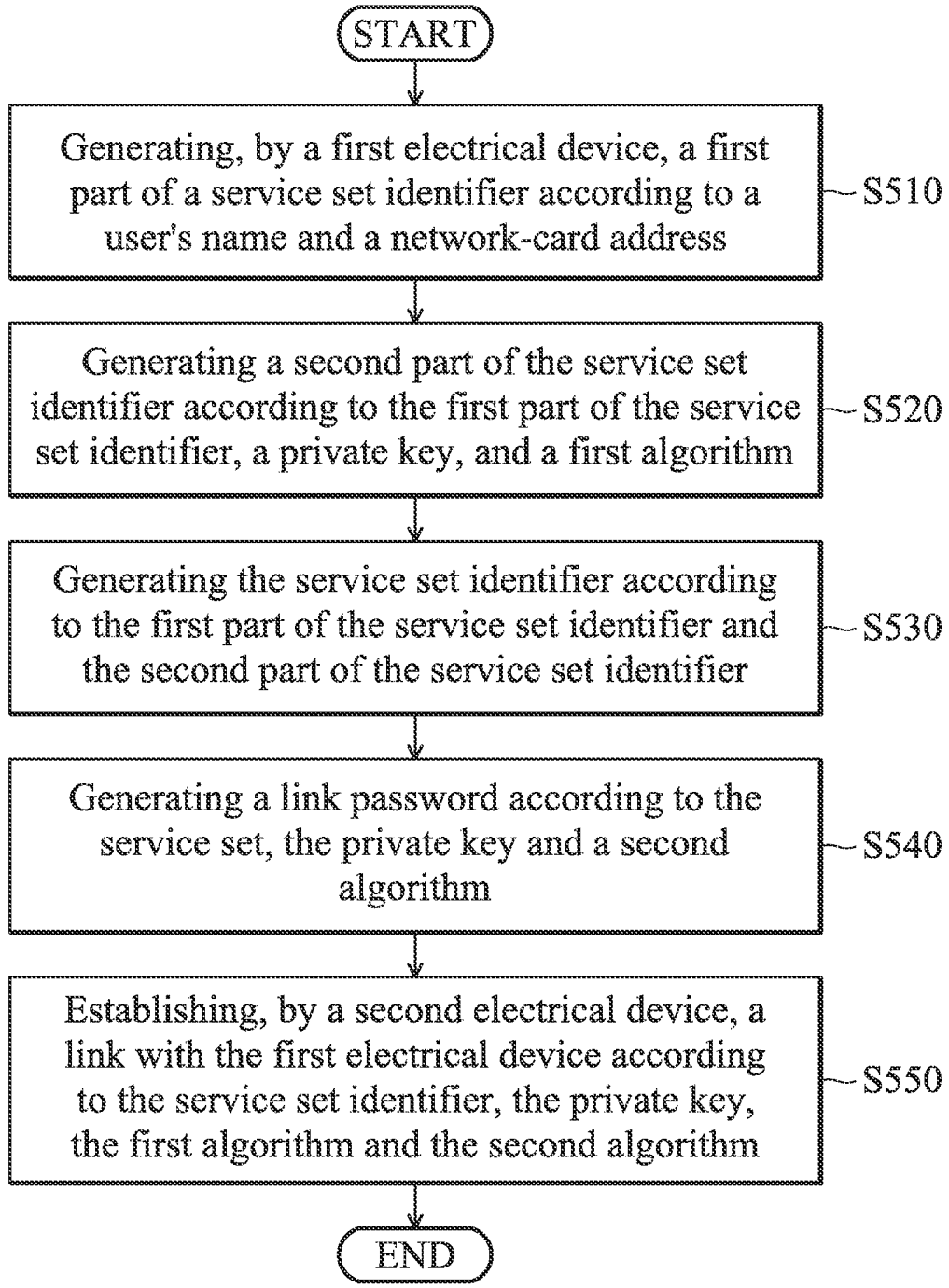
FIG. 5 is a flowchart 500 of a method for establishing a link according to an embodiment of the invention.

FIG. 5 is a flowchart 500 of a method for establishing a link according to an embodiment of the invention. The method is applied to the system 100. Firstly, in step S510, a first part of a service set identifier is generated according to a user's name and a network-card address by the first electrical device 110. In step S520, a second part of the service set identifier is generated according the first part of the service set identifier, a private key and a first algorithm by the first electrical device 110. In step S530, the service set identifier is generated according to the first part and second part of the service set identifier by the first electrical device 110. In step S540, a link password is generated according to the service set identifier, private key and a second algorithm. In step S550, a link with the first electrical device is established according to the service set identifier, private key, the first algorithm and the second algorithm by the second electrical device. In the embodiment, the first part of the service set identifier and the second part of the service set identifier are separated by a semicolon.

Figure 6:
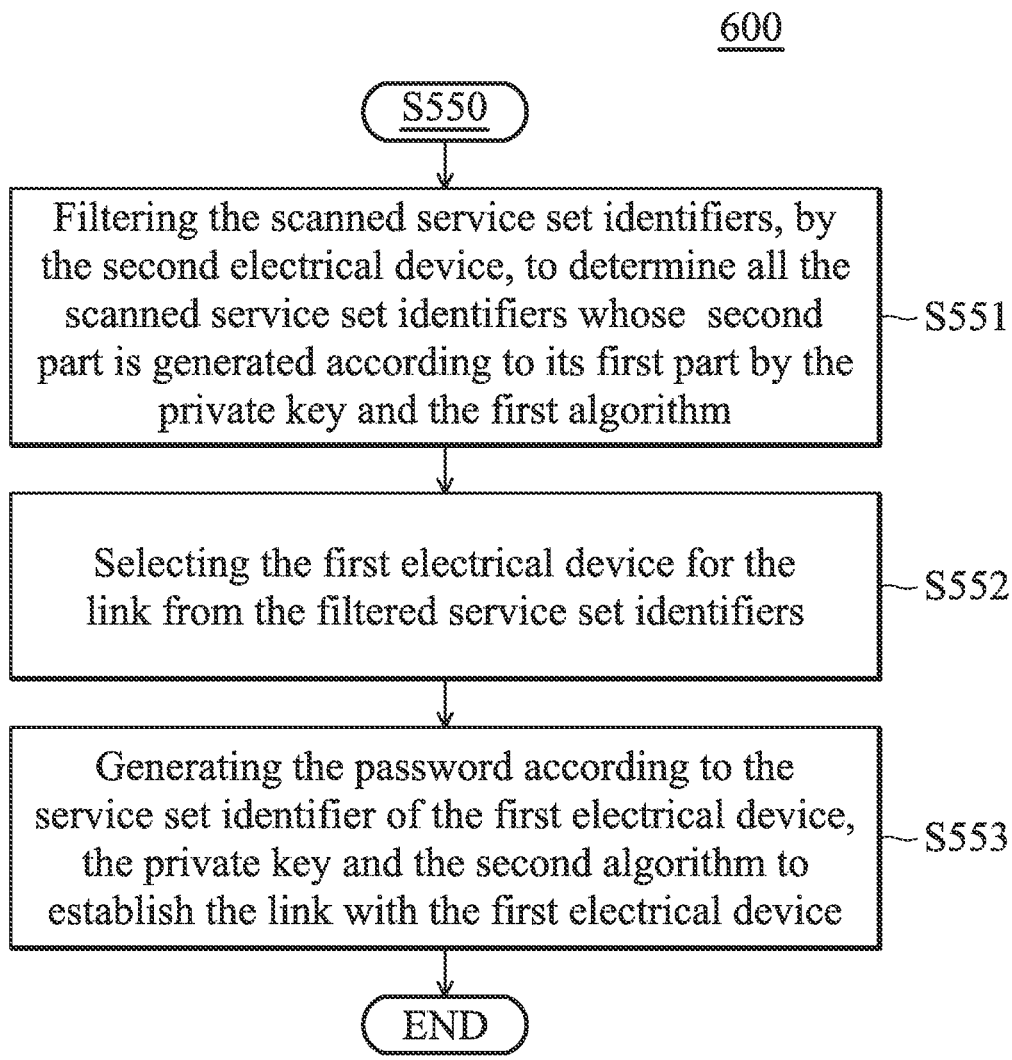
FIG. 6 is a flowchart 600 of step S550 according to an embodiment of the invention.

FIG. 6 is a flowchart 600 of step S550 according to an embodiment of the invention. Step S550 further comprises: In step S551, all of the service set identifiers in the network are scanned by the second electrical device 120, and the scanned service set identifiers are filtered by the private key and the first algorithm to determine all the scanned service set identifiers whose second part is generated according to its first part. In step S552, the service set identifier corresponding to the first electrical device is selected by the second electrical device after filtering. In step S553, the link password is generated by the second electrical device according to the service set identifier of the first electrical device, the private key and the second algorithm to establish the link with the electrical device 110.

In an embodiment of the invention, the method further comprises that IP address is automatically set by the first electrical device 110 and the second electrical device 120.

Compared to the traditional method, in the method for establishing an Ad-Hoc network link of the invention, the user doesn't need to open multiple windows to set the Ad-Hoc network. The user only needs one user interface to establish or interrupt the Ad-Hoc network.

In addition, in the method for establishing an Ad-Hoc network link of the invention, the user doesn't need to set the service set identifier and input link password. The service set identifier can be generated by the user's name, network-card address, private key and algorithm. Therefore, the service set identifier will be different from other service set identifiers of other electrical devices. Therefore, it becomes more easy and rapid for the user to find and select the service set identifier.

In addition, in the method for establishing an Ad-Hoc network link of the invention, the user doesn't install the Dynamic Host Configuration Protocol (DHCP) server to provide the IP to the electrical device. The electrical device may automatically set a fixed IP address and resolve the problem of conflicting IP addresses.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but does not denote that they are present in every embodiment. Thus, the appearance of the phrases "in one embodiment" or "in an embodiment" in various places throughout this specification are not necessarily referring to the same embodiment of the invention.

The above paragraphs describe many aspects of the invention. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for establishing a link, applied to an Ad-Hoc network, comprising:
   generating, by a first electrical device, a first part of a service set identifier according to a user's name and a network-card address;
   generating a second part of the service set identifier according to the first part of the service set identifier, a private key, and a first algorithm;
   generating the service set identifier according to the first part of the service set identifier and the second part of the service set identifier;
   generating a link password according to the service set identifier, the private key and a second algorithm; and
   establishing, by a second electrical device, a link with the first electrical device according to the service set identifier, the private key, the first algorithm and the second algorithm.

2. The method of claim 1, further comprising:
   scanning all of the service set identifiers in a network;
   filtering the scanned service set identifiers, by the second electrical device, to determine all the scanned service set identifiers whose second part is generated according to its first part by the private key and the first algorithm;
   selecting the first electrical device for the link from the filtered service set identifiers; and
   generating the password according to the service set identifier of the first electrical device, the private key and the second algorithm to establish the link with the first electrical device.

3. The method of claim 1, wherein the first part and the second part of the service identifier are separated by a semicolon.

4. The method of claim 1, further comprising:
   setting IP address of the first electrical device and the second electrical device automatically.

5. The method of claim 1, further comprising:
   determining whether to establish or interrupt the link by a user interface.

6. The method of claim 5, further comprising:
   selecting the first electrical device and the second electrical device as a host, a client, or a host and a client at the same time.

7. A system for establishing link, applied to an Ad-Hoc network, comprising:
   a first electrical device, configured to generate a first part of a service set identifier according to a user's name, a network-card address, generate a second part of the service set identifier according to the first part of the service set identifier, a private key and a first algorithm, generate the service set identifier according to the first part of the service set identifier and the second part of the service set identifier and generate a link password according to the service set identifier, the private key and a second algorithm; and
   a second electrical device, configured to establish a link with the first electrical device according to the service set identifier, the private key, the first algorithm and the second algorithm.

8. The system of claim 7, wherein the second electrical device further filters all scanned service set identifiers according to determine for all the scanned service set identifiers which the second part of the service set identifier is generated according to the first part by the private key and the first algorithm, selects the first electrical device for the link from the filtered service set identifiers; and generates the password according to the service set identifier of the first electrical device, the private key and the second algorithm to establish the link with the first electrical device.

9. The system of claim 7, wherein the first part and the second part of the service identifier are separated by a semicolon.

10. The system of claim 7, wherein the first electrical device and the second electrical device automatically set an IP address.

11. The system of claim 7, wherein the first electrical device and the second electrical device determine whether to establish or interrupt the link according to a selected result on a user interface.

12. The system of claim 7, wherein the first electrical device and the second electrical device determine to be a host, a client, or a host and a client at the same time according to the selected result.

13. A device for establishing a link, applied to a host of an Ad-Hoc network, comprising:
- a wireless network module, configured to link with another electrical device;
- a control module, configured to generate a first part of a service set identifier according to a user's name, a network-card address, generate a second part of the service set identifier according to the first part of the service set identifier, a private key and a first algorithm, generate the service set identifier according to the first part of the service set identifier and the second part of the service set identifier and generate a link password according to the service set identifier, the private key and a second algorithm; and
- a storage module, configured to store the first algorithm, the second algorithm and the private key.

14. The device of claim 13, further comprising:
- a display module, configured to display a user interface, wherein the control module determine establish or interrupt the link according to a selected result on a user interface and determine the device is a host, a client, or a host and a client at the same time according to the selected result.

15. The device of claim 13, wherein the control module is further configured to generate an IP address.

16. A device for establishing a link, applied to a client of an Ad-Hoc network, comprising:
- a wireless network module, configured to link with another electrical device;
- a control module, configured to filter all scanned service set identifiers in a network to determine all the scanned service set identifiers whose second part is generated according to its first part by a private key and a first algorithm, wherein the first part is generated by the another electrical device according to a user's name and a network-card address, selects the another electrical device for the link from the filtered service set identifiers, and generates a password according to the service set identifier of the selected another electrical device, the private key and a second algorithm to establish the link with the another electrical device; and
- a storage module, configured to store the first algorithm, the second algorithm and the private key.

17. The device of claim 16, further comprising:
- a display module, configured to display a user interface, wherein the control module determines whether to establish or interrupt the link according to a selected result on a user interface and determine the device is a host, a client, or a host and a client at the same time according to the selected result.

18. The device of claim 17, wherein the control module arranges the filtered service set identifiers in order according to the signal strengths of the filtered service set identifiers, and the display module displays the arranged result.

19. The device of claim 16, wherein the control module is further configured to generate an IP address.

20. The device of claim 19, wherein the control module is configured to transmit a packet to confirm whether the IP address has been used.

* * * * *